(12) United States Patent
Kondo

(10) Patent No.: US 7,069,012 B2
(45) Date of Patent: Jun. 27, 2006

(54) CDMA CELLULAR SYSTEM IN WHICH DIFFERENT CHANNEL IS ALLOCATED

(75) Inventor: Seiji Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 10/325,848

(22) Filed: Dec. 23, 2002

(65) Prior Publication Data

US 2003/0125036 A1    Jul. 3, 2003

(30) Foreign Application Priority Data

Dec. 27, 2001   (JP)   ............................. 2001-397912

(51) Int. Cl.
*H04Q 7/20* (2006.01)
(52) U.S. Cl. .................. 455/450; 455/452.1; 370/329; 370/341; 370/342
(58) Field of Classification Search ................ 455/450, 455/451, 452.1, 452.2, 446, 447, 449, 509, 455/464, 560, 562; 370/329, 334, 335, 342, 370/320, 341
See application file for complete search history.

(56) References Cited

U.S. PATENT DOCUMENTS

| | | | |
|---|---|---|---|
| 5,519,884 A | * | 5/1996 | Duque-Anton et al. ..... 455/450 |
| 5,697,059 A | * | 12/1997 | Carney ....................... 455/509 |
| 5,913,167 A | * | 6/1999 | Bonta et al. ................ 455/436 |
| 5,991,628 A | | 11/1999 | Pedziwiatr et al. |

FOREIGN PATENT DOCUMENTS

| | | |
|---|---|---|
| CN | 1265255 A | 8/2000 |
| DE | 199 09 779 | 9/2000 |
| EP | 1 022 921 A2 * | 7/2000 |
| EP | 1 024 611 | 8/2000 |
| JP | 6-334594 | 12/1994 |
| JP | 9-200838 | 7/1997 |
| JP | 11-187457 | 7/1999 |
| JP | 2000-59388 | 2/2000 |
| JP | 2000-152322 | 5/2000 |
| JP | 2001-78251 | 3/2001 |
| WO | WO 00/54531 | 9/2000 |
| WO | WO 00/54533 | 9/2000 |

* cited by examiner

*Primary Examiner*—Charles N. Appiah
(74) *Attorney, Agent, or Firm*—Young & Thompson

(57) ABSTRACT

A CDMA cellular system includes a plurality of base station control apparatuses, each of which is provided for a service area of cells, and a plurality of radio base stations, each of which is provided for one of the cells and is connected with one of the plurality of base station control apparatuses. Each base station control apparatuses has a radio channel data table including a group of radio channel data as a specific group of radio channel data, and selects one of the radio channel data of the specific group as a specific radio channel data in response to a channel allocation request. The specific groups of radio channel data for the plurality of base station control apparatuses are different from each other. The radio base station establishes a radio channel between the radio base station and the radio terminal based on the specific radio channel data.

19 Claims, 7 Drawing Sheets

Fig. 3

| PECULIAR NUMBER R | GROUP NUMBER G |
|---|---|
| 1 | 1 |
| 2 | 2 |
| 3 | 3 |
| : | : |
| : | : |

| PECULIAR NUMBER R | GROUP NUMBER G |
|---|---|
| 1 | 2 |
| 2 | 3 |
| 3 | 4 |
| : | : |
| : | : |

Fig. 7

| PECULIAR NUMBER R | GROUP NUMBER G |
|---|---|
| 1 | 3 |
| 2 | 4 |
| 3 | 5 |
| : | : |
| : | : |

CDMA CELLULAR SYSTEM IN WHICH DIFFERENT CHANNEL IS ALLOCATED

BACKGROUND OF THE INVENTION

1. Field of the Invention

The present invention relates to a CDMA cellular system.

2. Description of the Related Art

In a code division multiple access (CDMA) cellular system, a plurality of terminals such as mobile phones can be accommodated in a service area by dividing the service area into cells, and by using different codes in each of frequency bands.

FIG. 1 shows a conventional general system configuration of the CDMA cellular system. Referring to FIG. 1, the CDMA cellular system is composed of base station control apparatuses 100-1 and 100-2, radio base stations 200-1, 200-2, 200-3, 200-4, 200-5, and 200-6, radio terminals 300-1 and 300-2, a cellular system switching apparatus 400, and a network management system apparatus 420.

The cellular system switching apparatus 400 is connected in wires with a general network 500 and the base station control apparatuses 100-1 and 100-2 arranged for the respective service areas, each of which is composed of a plurality of cells. The base station control apparatus 100-1 is connected in wires with the radio base stations 200-1, 200-2 and 200-3 which are arranged for the respective cells, and the base station control apparatus 100-2 is connected in wires with the radio base stations 200-4, 200-5 and 200-6 which are arranged for the respective cells.

The radio terminals 300-1 and 300-2 are connected in radio with the radio base stations corresponding to the cells where the radio terminals 300-1 and 300-2 exist, respectively. Also, the radio terminals 300-1 and 300-2 can communicate with each other through the base station control apparatuses 100-1 and 100-2 and the cellular system switching apparatus 400. Also, the radio terminals 300-1 and 300-2 can communicate with a general subscriber telephone 600 which is connected with the general network 500.

In this case, in the conventional CDMA cellular system, the radio channel to be used is selected and allocated between the radio base station and the radio terminal independently for every base station control apparatus. For this reason, there is a case that one radio channel allocated by the base station control apparatus 100-1 is same as that allocated by the base station control apparatus 100-2. In this case, if hand-over is carried out from the base station control apparatus 100-1 to the base station control apparatus 100-2, interference occurs between the radio terminals 300-1 and 300-2. Therefore, it is necessary that the radio channel allocated by the base station control apparatus 100-1 and the radio channel allocated by the base station control apparatus 100-2 are different from each other.

For the purpose of solving the above problem, a method is proposed in which when a call is issued, the base station control apparatus communicate with another base station control apparatus to determine channels allocated already by the other base station control apparatus, and allocates a channel not yet allocated for the call. However, in this method, it is necessary that the base station control apparatus and the other base station control apparatus communicate with each other every time a call is issued. Therefore, it results in increasing the load of the base station control apparatus and other base station control apparatus.

In conjunction with a method of allocating a communication band is disclosed in Japanese Laid Open Patent Application (JP-A-Heisei 6-334594). In the method of this conventional example, non-combination groups (super cells) of cells are formed to minimize interference in each group. Specific channels of communication bands are allocated in common to the groups, respectively. The communication bands of the specific channels are dynamically allocated to cells in each group in accordance with a user request from each cell.

Also, a mobile communication system is disclosed in Japanese Laid Open Patent Application (JP-A-Heisei 9-200838. Te mobile communication system of this conventional example is composed of a mobile station, a plurality of base stations, a plurality of control stations and an integrating station. The base station provides a service for each of cells obtained by dividing a service area. The control station manages radio channels used by the base stations without recognition of an arrangement of the base stations belonging to the control station and controls the base stations. The integrating station recognizes an arrangement of the control stations and controls the control stations the radio channels used in the control stations and cell relation of cells serviced by the control stations.

Also, a communication channel selecting method is disclosed in Japanese Laid Open Patent Application (JP-P 2000-152322). In a digital cordless telephone of this conventional example, a digital cordless telephone and a plurality of radio connection apparatuses are connected with a main apparatus which accommodates lines. A plurality of communication channels are grouped into a plurality of groups. The connection apparatus searches even-numbered (odd-numbered) communication channels of a corresponding group in order for an unused channel and searches odd-numbered (even-numbered) communication channels of the corresponding group for the unused channel when the unused channel is not found in the above process.

Also, a method of allocating communication frequency band is disclosed in Japanese Laid Open Patent Application (JP-P2000-59388A). In the method of this conventional example, a terminal apparatus is physically connected to a network connection apparatus to form a radio communication apparatus. A specific frequency band is allocated to the network connection apparatus in a network based on a serial number of the network communication apparatus. The radio communication apparatuses are connected by a cable to share data of the channels.

Also, a cordless telephone apparatus is disclosed in Japanese Laid Open Patent Application (JP-P2001-78251A). The cordless telephone apparatus of this conventional example is composed of a grouping section which groups channels based on an ID code or a PN series. A changing section switches the ID code or the PN series. A storage section stores unused channels in a reception scanning. A communication channel is determined based on the unused channels before the channel group is switched, when a link formation is started before the scanning is carried out by switching the channel group.

SUMMARY OF THE INVENTION

Therefore, an object of the present invention is to provide a CDMA cellular system in which it is possible to prevent that radio channels allocated in different base station control apparatuses are same.

Another object of the present invention is to provide a CDMA cellular system in which radio channels are grouped and the groups are allocated based on a base station control apparatus.

Another object of the present invention is to provide a CDMA cellular system in which radio channels are grouped and the groups are allocated based on a base station control apparatuses and time.

In an aspect of the present invention, a CDMA cellular system includes a plurality of base station control apparatuses, each of which is provided for a service area of cells, and a plurality of radio base stations, each of which is provided for one of the cells and is connected with one of the plurality of base station control apparatuses. Each of the plurality of base station control apparatuses has a radio channel data table including a group of radio channel data as a specific group of radio channel data, and selects one of the radio channel data of the specific group as a specific radio channel data in response to a channel allocation request. The specific groups of radio channel data for the plurality of base station control apparatuses are different from each other. The radio base station establishes a radio channel between the radio base station and a radio terminal associated with the channel allocation request based on the specific radio channel data.

Here, each of the plurality of base station control apparatuses may include a storage section, a channel selecting section and an informing section. The storage section stores the radio channel data table including the specific group of radio channel data. The channel selecting section refers to the radio channel data table in response to the channel allocation request to determine one of the radio channel data of the specific group as the specific radio channel data. The informing section informs the specific radio channel data to the radio base station. The radio base station establishes the radio channel between the radio base station and the radio terminal based on the specific radio channel data.

In this case, the CDMA cellular system may further include a network management system apparatus which transmits the plurality of the radio channel data tables to the plurality of base station control apparatuses, respectively. The specific groups of radio channel data for the plurality of base station control apparatuses are different from each other.

Also, each of the plurality of base station control apparatuses may have a peculiar number, and the network management system apparatus may determine a group number based on the peculiar number and determines the specific group of the radio channel data based on the group number.

In this case, the network management system apparatus may determine the group number G based on the following equation (1):

$$G = R \bmod m \qquad (1)$$

where R is the peculiar number, and m is the number of the base station control apparatuses.

Also, each of the radio channel data of the specific group may have a flag to indicate that a radio channel corresponding to the radio channel data is being used. The channel selecting section may select the specific radio channel data from among the radio channel data of the specific group based on the flags. In this case, the channel selecting section may set the flag corresponding to the specific radio channel data being in a reset state, and may reset the flag corresponding to the selected radio channel data, when communication on the radio channel established based on the specific radio channel data is disconnected.

Also, the number of the radio channel data of the specific group for one of the plurality of base station control apparatuses may be different from the number of the radio channel data of the specific group for another of the plurality of base station control apparatuses.

In another aspect of the present invention, a CDMA cellular system includes a plurality of base station control apparatuses, each of which is provided for a service area of cells; and a plurality of radio base stations, each of which is provided for one of the cells and is connected with one of the plurality of base station control apparatuses. Each of the plurality of base station control apparatuses has a radio channel data table including a plurality of groups of radio channel data, and selects one of the plurality of groups of radio channel data as the specific group of radio channel data. Then, the base station control apparatus selects one of the radio channel data of the specific group as a specific radio channel data in response to a channel allocation request. The radio base station establishes a radio channel between the radio base station and the radio terminal based on the specific radio channel data.

Here, each of the plurality of base station control apparatuses may select one of the plurality of groups of radio channel data as the specific group of radio channel data based on time data.

Also, each of the plurality of base station control apparatuses may include a timer section, a storage section, a channel selecting section and an informing section. The timer section generates the time data, and the storage section stores the radio channel data table including a plurality of groups of radio channel data. The channel selecting section may select one of the plurality of groups of radio channel data as the specific group of radio channel data based on the time data in response to the channel allocation request, and may determine one of the radio channel data of the specific group as the specific radio channel data. The informing section informs the specific radio channel data to the radio base station. The radio base station may establish the radio channel between the radio base station and the radio terminal based on the specific radio channel data.

In this case, each of the plurality of base station control apparatuses may have a peculiar number, and the channel selecting section may determine a group number based on the peculiar number and the time data and selects the specific group of the radio channel data based on the group number.

Also, the channel selecting section may determine the group number G based on the following equation (2):

$$G = (R + T) \bmod m \qquad (2)$$

Where R is the peculiar number, T is the time data and m is the number of the base station control apparatuses.

Also, each of the radio channel data of the specific group may have a flag to indicate that a radio channel corresponding to the radio channel data is being used. The channel selecting section may select the specific radio channel data from among the radio channel data of the specific group based on the flags.

In this case, the channel selecting section may set the flag corresponding to the specific radio channel data being in a reset state, and may reset the flag corresponding to the selected radio channel data, when communication on the radio channel established based on the specific radio channel data is disconnected.

Also, the number of the radio channel data of the specific group for one of the plurality of base station control apparatuses may be different from the number of the radio channel data of the specific group for another of the plurality of base station control apparatuses.

Also, the number of the radio channel data may be different for every group.

In another aspect of the present invention, in a method of establishing a unique radio channel, a CDMA cellular system includes a plurality of base station control apparatuses, each of which is provided for a service area of cells; and a plurality of radio base stations, each of which is provided for one of the cells and is connected with one of the plurality of base station control apparatuses. A specific one of the plurality of radio base stations accommodates a radio terminal, and a specific one of the plurality of base station control apparatuses accommodates the specific radio base station. The method is achieved by (a) the specific base station control apparatus storing a radio channel data table including a group of radio channel data as a specific group of radio channel data, wherein the specific groups of radio channel data for the plurality of base station control apparatuses are different from each other; by (b) the specific base station control apparatus selecting one of the radio channel data of the specific group as a specific radio channel data in response to a channel allocation request; and by (c) the specific radio base station establishing a radio channel with the radio terminal based on the specific radio channel data.

Here, each of the plurality of base station control apparatuses may have a peculiar number, and a network management system apparatus may be connected with the plurality of base station control apparatuses. The method may further include the step of: (d) the network management system apparatus determining a group number for the specific base station control apparatus based on the peculiar number; (e) the network management system apparatus determining one of a plurality of groups of the radio channel data of the radio channel data table based on the group number; and (f) the network management system apparatus transmitting the radio channel data table including the determined group of radio channel data as the specific group of radio channel data to the specific base station control apparatus.

Also, each of the plurality of base station control apparatuses may have a peculiar number, and the radio channel data table may include a plurality of groups of radio channel data. The (b) selecting step may be achieved by (g) the specific base station control apparatus generating time data; by (h) the specific base station control apparatus determining a group number based on the peculiar number and the time data; by (i) the specific base station control apparatus determining one of the plurality of groups of radio channel data as the specific group of radio channel data based on the group number; and by (j) the specific base station control apparatus selecting one of the radio channel data of the specific group as the specific radio channel data.

BRIEF DESCRIPTION OF THE DRAWINGS

FIG. 3 is a diagram showing a group number table used in the CDMA cellular system according to the first embodiment of the present invention;

FIG. 6 is a diagram showing relation of a peculiar number and a group number at a time in the CDMA cellular system according to a second embodiment of the present invention;

FIG. 7 is a diagram showing relation of a peculiar number and a group number at another time in the CDMA cellular system according to a second embodiment of the present invention.

DESCRIPTION OF THE PREFERRED EMBODIMENTS

Hereinafter, a code division multiple access (CDMA) cellular system of the present invention will be described in detail with reference to the attached drawings.

First Embodiment

Figure 1:
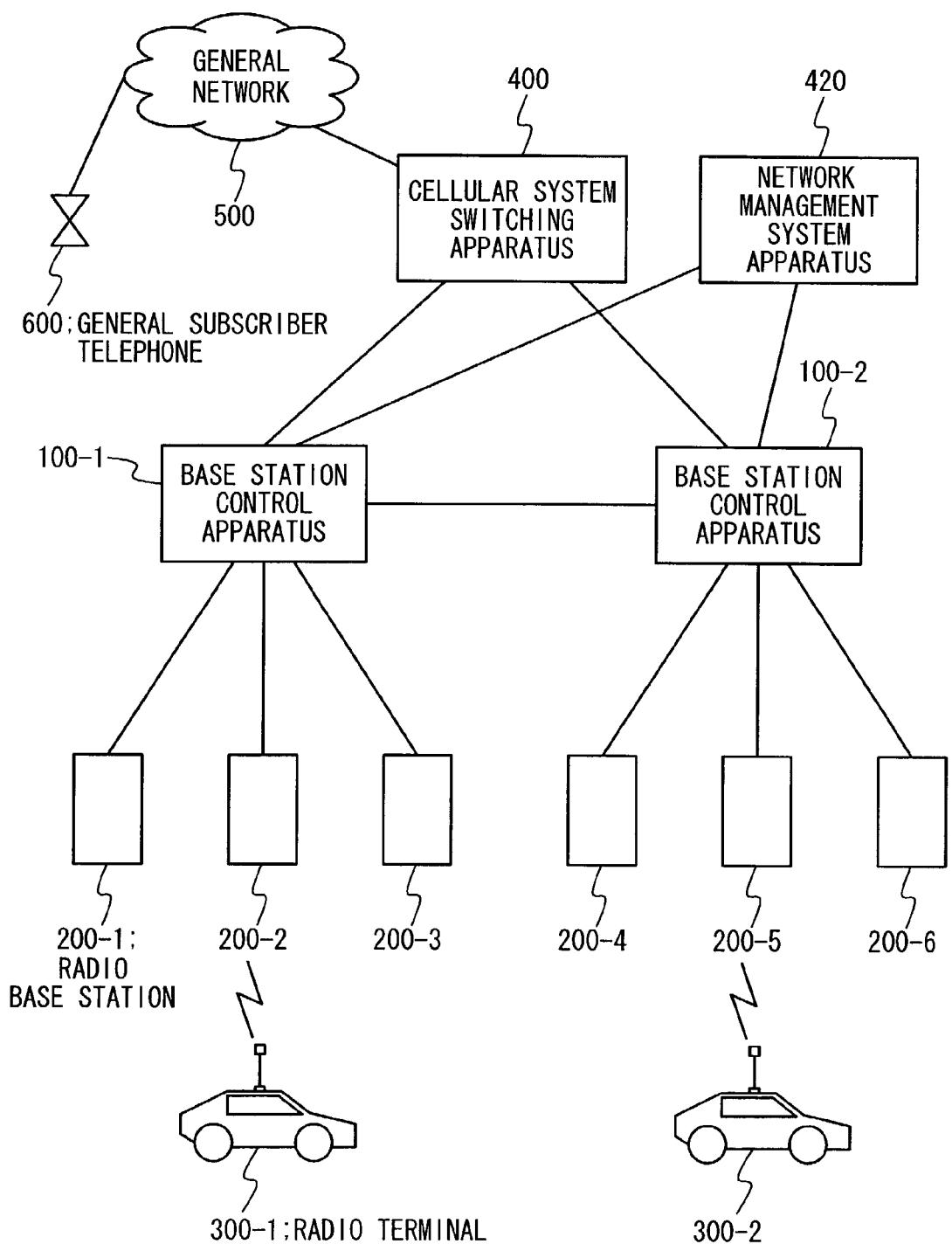
FIG. 1 is a block diagram showing the configuration of a CDMA cellular system.

The structure of the CDMA cellular system of the present invention is same as that shown in FIG. 1. That is, the CDMA cellular system is composed of base station control apparatuses 100-1 and 100-2, radio base stations 200-1, 200-2, 200-3, 200-4, 200-5, and 200-6, radio terminals 300-1 and 300-2, a cellular system switching apparatus 400, and a network management system apparatus 420. The cellular system switching apparatus 400 is connected in wires with a general network 500 and the base station control apparatuses 100-1 and 100-2 arranged for the respective service areas, each of which is composed of a plurality of cells. The base station control apparatus 100-1 is connected in wires with the radio base stations 200-1, 200-2 and 200-3 which are arranged for the respective cells, and the base station control apparatus 100-2 is connected in wires with the radio base stations 200-4, 200-5 and 200-6 which are arranged for the respective cells. A radio terminal 300-1 is accommodated by the radio base station 200-2, and a radio terminal 300-2 is accommodated by the radio base station 200-5. Also, the network management system apparatus 420 is connected in wires with the base station control apparatuses 100-1 and 100-2. A peculiar number is allocated to each of a plurality of base station control apparatuses including the base station control apparatuses 100-1 and 100-2.

Figure 4:
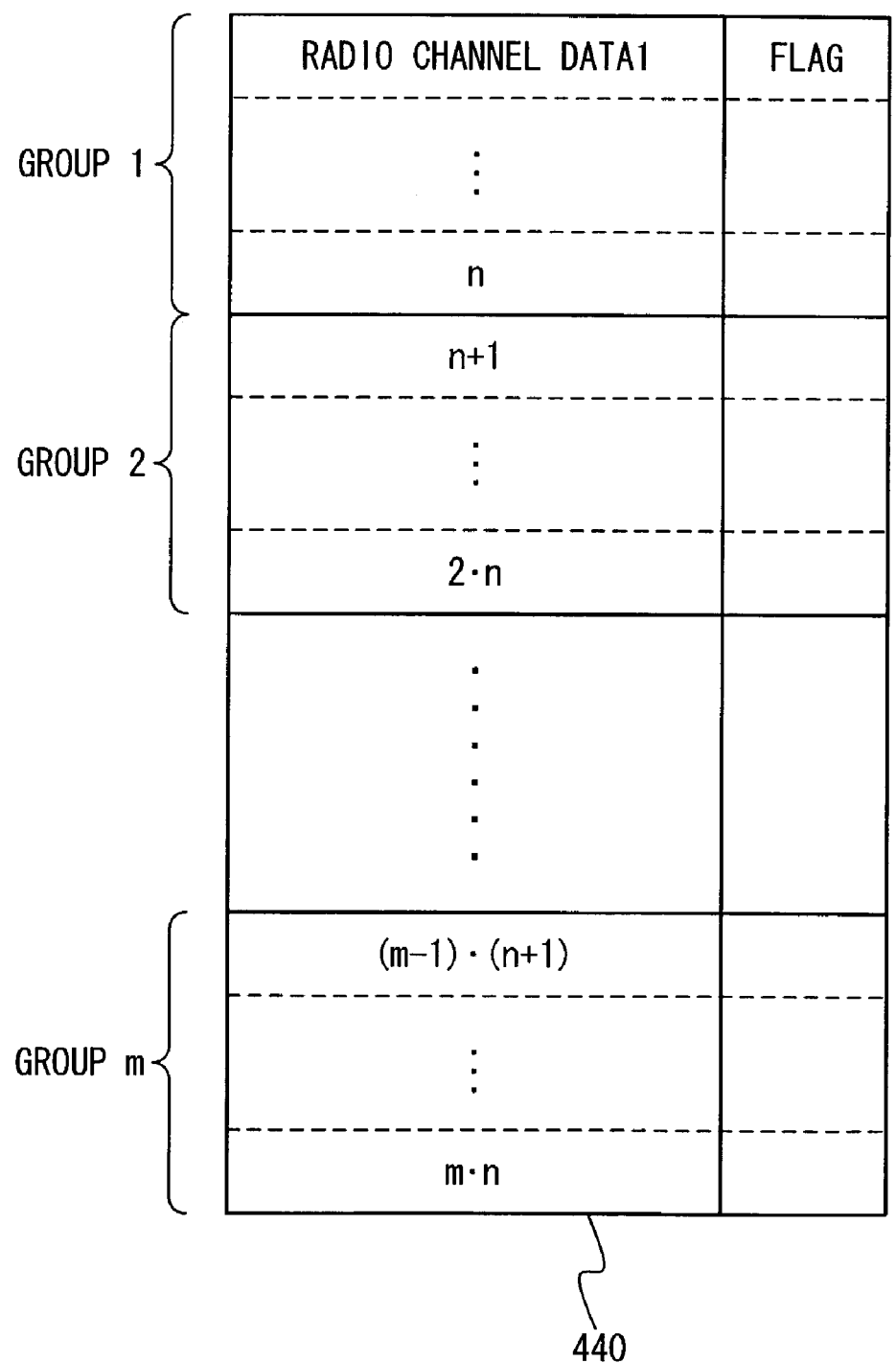
FIG. 4 is a diagram showing a channel group table used in the CDMA cellular system according to the first embodiment of the present invention.

The network management system apparatus 420 stores a group number table 430 shown in FIG. 3 which shows a group number for a peculiar number and a radio channel data table shown in FIG. 4 which includes a plurality of groups of radio channel data for every group number. The radio channel data table stores m (m may be equal to the number of the base station control apparatuses) groups of radio channel data. In this example, each group is composed of n radio channel data. A flag is provided for each of the n radio channel data, is set when a radio channel corresponding to the flag is used and reset when the radio channel is not used. The network management system apparatus 420 transmits the radio channel data table including the m groups of radio channel data to the base station control apparatuses.

Figure 2:
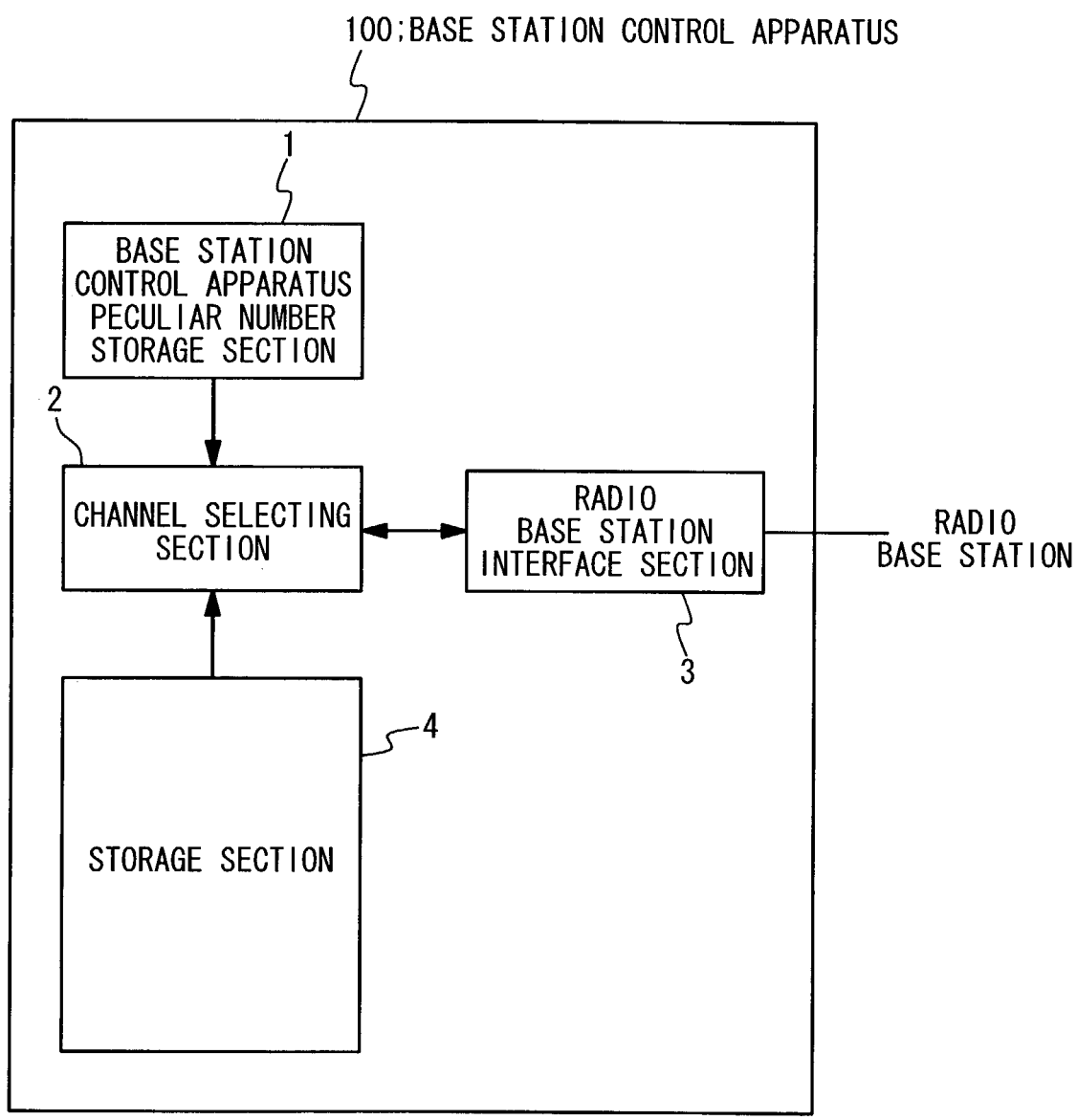
FIG. 2 is a block diagram showing the configuration of a base station control apparatus used in a CDMA cellular system according to a first embodiment of the present invention.

FIG. 2 shows the structure of the base station control apparatus. As shown in FIG. 2, the base station control apparatus 100 is composed of a peculiar number storage section 1, a channel selection processing section 2, a base station radio apparatus interface section 3 and a storage section 4.

The peculiar number storage section 1 stores data of a peculiar number which is previously determined for every base station control apparatus. The storage section 4 stores a radio channel data table which includes the m groups of radio channel data. The radio channel data table in this example stores all the radio channel data usable in the CDMA cellular system.

The channel selection processing section 2 selects the radio channel data to be allocated between the base station radio apparatus and the radio terminal in response to a channel allocation request from a radio terminal via a radio base station. First, the channel selecting section 2 acquires the peculiar number R from the peculiar number storage section 1 and determines a group number G from the peculiar number R. Then, the channel selecting section 2 refers to the radio channel data table stored in the storage section 4 based on the group number G to determine one of the m groups of radio channel data, and selects one of the radio channel data of the determined group based on whether the flag of each of the radio channel data is set or reset. Thus, the one radio channel data is selected. At this time, the channel selecting section 2 sets the flag corresponding to the selected radio channel data.

The radio base station interface section 3 carries out an interface process to allocate the radio channel data selected by the channel selecting section 2 to the radio base station and the radio terminal.

Hereinafter, an operation of the CDMA type cellular system in the first embodiment will be described.

Now, for example, when a general subscriber telephone 600 and a radio terminal 300-1 communicate with each other, it is necessary to establish a communication channel via the base station control apparatus 100-1 and the radio base station 200-2 between the cellular system switching apparatus 400 and the terminal 300-1. In the CDMA cellular system of the present invention, in order to establish the communication channel, a different radio channel is allocated between the terminal 300-1 and the radio base station 200-2 for every terminal.

In the generation of a call from the radio terminal 300-1, the radio terminal 300-1 issues a channel allocation request through a common channel (not shown) with the radio base station 200-2, and the radio base station apparatus 200-2 outputs the channel allocation request to the base station control apparatus 100-1. In this case, the base station control apparatus 100-1 carries out the allocation of the radio channel between the radio base station 200-2 and the radio terminal 300-1. However, at this time, in the base station control apparatus 100-1, the channel selecting section 2 selects a specific radio channel data of a group from the channel group table based on the peculiar number from the peculiar number storage section 1.

Thus, the base station control apparatus 100-1 can select the group of radio channel data different from the group of radio channel data selected by the other base station control apparatus 100-2. Specifically, the channel selecting section 2 carries out the process for determining the radio channel data to be selected by the base station control apparatus 100-1 as follows.

For example, the channel selecting section 2 determines the group number G of the base station control apparatus 100-1 based on the peculiar number R in accordance with the following equation (1).

$$G = (R) \bmod m \quad (1)$$

where m is the number of groups. In this case, the relation of the peculiar number R and the group number G is as shown in FIG. 3.

In the base station control apparatus 100-1, the group number G is determined in this way, and then unused radio channel data which is not allocated to the other radio terminals is selected from the radio channel data of the group corresponding to the determined group number. Then, a radio channel corresponding to the selected radio channel data is allocated to the radio terminal 300-1 and the radio base station 200-2. At this time, the flag corresponding to the selected radio channel data is set in the radio channel data table to indicate that the channel is allocated. The flag is reset when the communication channel is released.

Next, the radio base station interface section 3 of the base station control apparatus 100-1 notifies the radio channel data selected by the channel selecting section 2 to the radio base station 200-2. Then, the radio base station 200-2 notifies the allocated radio channel data to the radio terminal 300-1 through the common channel (not shown). After that, the radio channel is established using the radio channel data allocated newly between the terminal 3001 and the radio base station 200-2.

At the same time, a communication channel is established in wires from the radio base station 200-2 to the general subscriber telephone 600 via the base station control apparatus 100-1, the cellular system switching apparatus 400 and the general network 500. In this case, the radio channel established between the radio terminal 300-1 and the radio base station 200-2 is one of the channel group which is peculiar to the base station control apparatus 100-1 and is an unused one which is not allocated to the other terminals. Therefore, the allocated channel is not same as the channel used in the radio base stations 200-1 to 200-3 belonging to the base station control apparatus 100-1, and the radio base stations belonging to the other base station control apparatuses.

The channel allocation is carried out between the radio terminal 300-1 and the base station radio apparatus 200-2 in response to the generation of a call, i.e., the channel allocation request from the radio terminal 300-1, similarly even in case that the radio terminal 300-1 communicates with the radio terminal 300-2 belonging to the other base station control apparatus 100-2.

Also, the communication channel is established from the cellular system switching apparatus 400 to the radio base station 200-5 through the base station control apparatus 100-2. Also, the base station control apparatus allocates the radio channel between the radio base station 200-5 and the radio terminal 300-2. Thus, the communication channel is established between the base station radio apparatus 200-5 and the radio terminal 300-2 using the allocated radio channel. In this case, the group of radio channel data used in the base station control apparatus 100-1 and the group of radio channel data used in the base station control apparatus 100-2 are different. Therefore, there is no case that the radio channel allocated between the radio terminal 300-1 and the radio base station 200-2 and the radio channel allocated between the radio terminal 300-2 and the radio base station 200-5 become same.

In this way, in the CDMA type cellular system of this example, the base station control apparatus divides the radio channel data corresponding to channels usable in the system into a plurality of groups and controls the channel allocation of the radio channel. The base station control apparatus determines a specific one from among the plurality of groups based on the peculiar number to the base station control apparatus, and selects a specific one from the radio channel data of the determined group and carries out the channel allocation. Therefore, it is possible to prevent that the radio channels allocated to the radio base stations contained in the different base station control apparatuses are same.

In the above description, a channel allocation request is issued from the radio terminal. However, when a general subscriber telephone generates a call to the radio terminal, the channel allocation request is issued from the general subscriber telephone and received by the base station control apparatus accommodating the radio terminal. This is applied to the following the second and third embodiments.

Second Embodiment

Next, the CDMA cellular system according to the second embodiment of the present invention will be described. In this embodiment, the system configuration of the CDMA cellular system is same as in the first embodiment.

Figure 5:
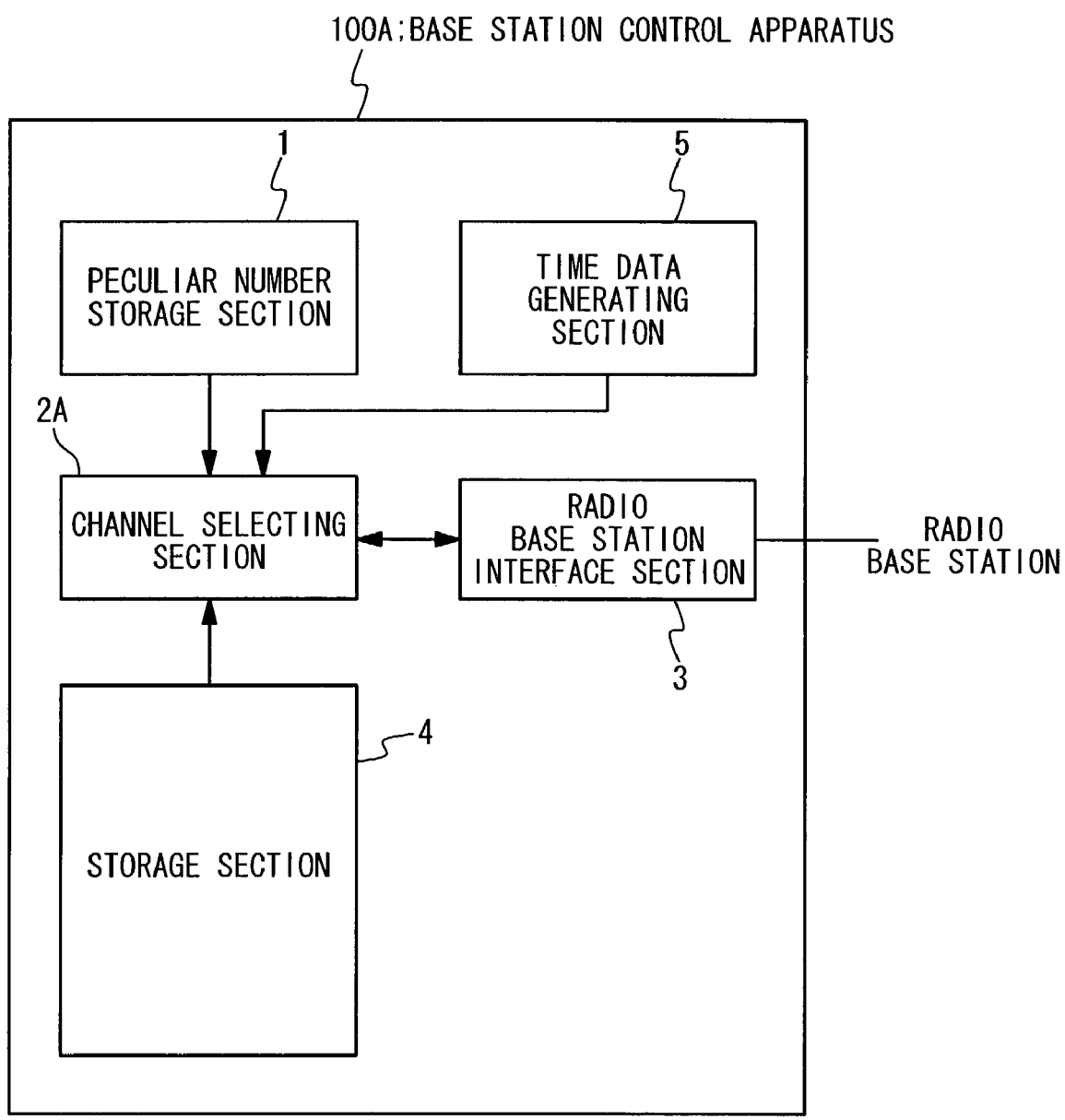
FIG. 5 is a block diagram showing the configuration of the base station control apparatus used in the CDMA cellular system according to a second embodiment of the present invention.
Figure 8:
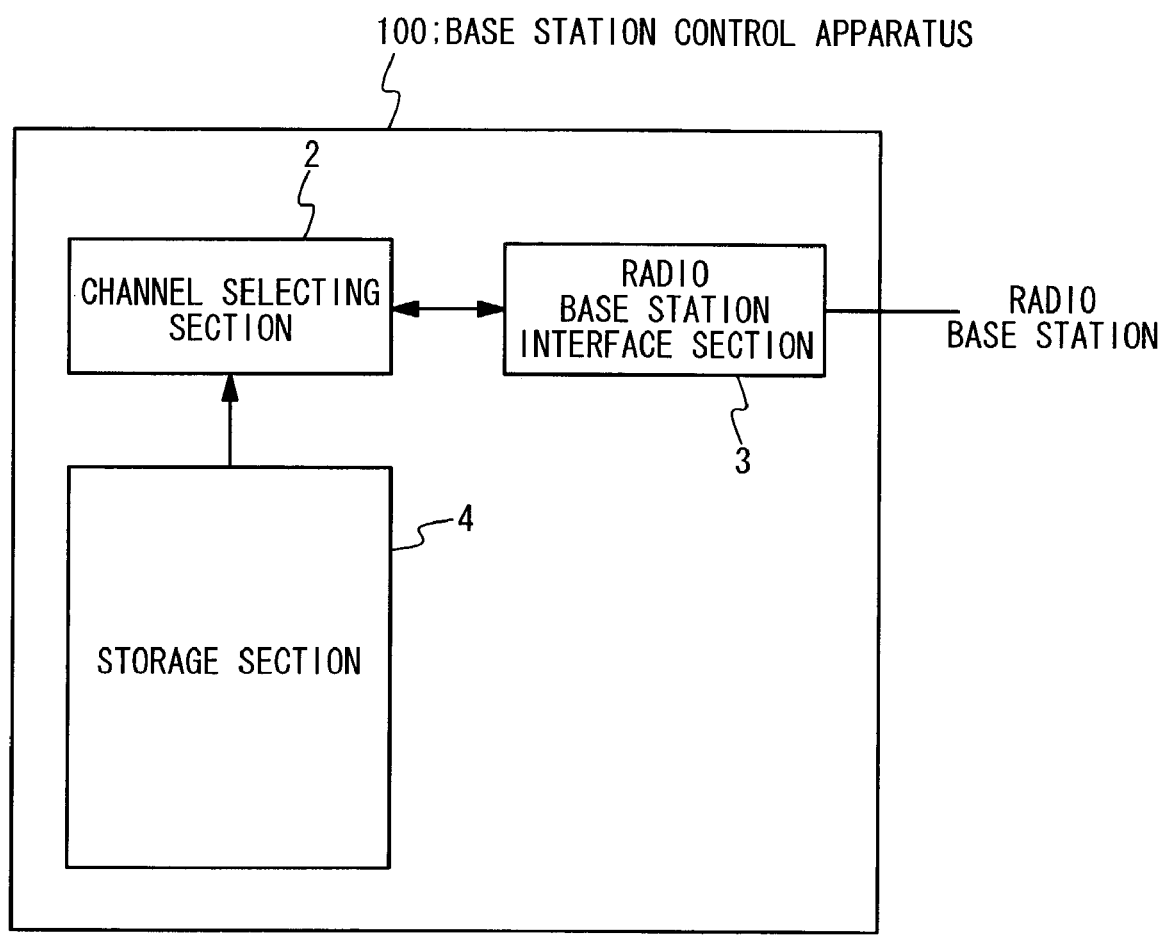
FIG. 8 is a block diagram showing the configuration of a base station control apparatus used in a CDMA cellular system according to a third embodiment of the present invention.

FIG. 5 is a block diagram showing the structure of the base station control apparatus in the CDMA cellular system according to the second embodiment of the present invention. FIG. 6 is a diagram showing relation of the base station control apparatus peculiar number R and the group number G at the time T=1 in this embodiment. FIG. 7 is a diagram showing relation of the base station control apparatus peculiar number R and the group number G to be selected at the time T=2 in this embodiment.

In the base station control apparatuses 100A in this example, is composed of a peculiar number storage section 1, a channel selecting section 2A, a radio base station interface section 3, a storage section 4 and a time data generating section 5, as shown in FIG. 5.

A peculiar number storage section 1 stores a peculiar number to the base station control apparatus 100. The storage section 4 stores the radio channel data table which has been transmitted from the network management system apparatus 420. The radio channel data table stores all the groups of radio channel data shown in FIG. 4.

The time data generating section 5 generates time data showing time. For example, the time data generating section 5 generates the time data for every hour.

The channel selecting section 2A carries out a process for selecting a radio channel between the radio base station and the radio terminal in response to a channel allocation request. That is, the channel selecting section 2A acquires the peculiar number of the base station control apparatus from the peculiar number storage section 1, and determines a group number based on the peculiar number and the time data. Then, the channel selecting section 2A refers to the radio channel data table stored in the storage section 4 based on the determined group number to determine one of the groups of radio channel data. Subsequently, the channel selecting section 2A selects one of the radio channel data of the determined group based on whether the flag of each of the radio channel data is set or reset, like the first embodiment. In this way, a radio channel is established between the radio base station and the radio terminal.

Next, a channel allocating operation in the CDMA cellular system in the second embodiment will be described.

The network management system apparatus 420 transmits the radio channel data table with same table structure as shown in FIG. 4 to the base station control apparatuses. Each of the base station control apparatuses stores the radio channel data table in the storage section 4.

The channel selecting section 2A carry out a process for determining the channel to be selected by the base station control apparatus 100A in response to the channel allocation request. For example, it is supposed that the base station control apparatus 100A with the peculiar number R determines the group number G and the time data T in accordance with the following equation (2) in response to the channel allocation request.

$$G = (R+T) \bmod m \quad (2)$$

where m is the number of groups, which may be equal to the number of base station control apparatuses.

Now, the relation of the peculiar number R and the group number G in case of the time data T=1 (after time 1 and before time 2) and m=1000 is shown in FIG. 6. In the same way, the relation of the peculiar number R and the group number G in case of the time data T=2 (after time 2 and before time 3) and m=1000 is shown in FIG. 7.

Subsequently, the channel selecting section 2A refers to the radio channel data table stored in the storage section 4 based on the determined group number to determine one of the groups of radio channel data. Subsequently, the channel selecting section 2A selects one of the radio channel data of the determined group based on whether the flag of each of the radio channel data is set or reset, like the first embodiment. At this time, an unused radio channel data, which is not allocated to the other radio terminals, is selected from among the radio channel data of the determined group. The channel selecting section 2A sets the flag corresponding to the selected radio channel data.

Next, the radio base station interface section 3 of the base station control apparatus 100-1 notifies the radio channel data selected by the channel selecting section 2A to the radio base station 200-2. Then, the radio base station 200-2 notifies the allocated radio channel corresponding to the selected radio channel data to the terminal 300-1 through the common channel (not shown). After that, the radio channel is established using the radio channel data allocated newly between the radio terminal 300-1 and the radio base station 200-2. Thus, the communication is started. Thereafter, when the communication is ended, the flag is reset by the channel selecting section 2.

In this way, in the CDMA cellular system of the second embodiment, the base station control apparatus which divides radio channel data usable in the system into a plurality of groups. Therefore, it is possible to prevent that the channels allocated between the different base station control apparatuses becomes same.

Third Embodiment

Next, the CDMA cellular system according to the third embodiment of the present invention will be described. In the third embodiment, the system configuration is same as in the first embodiment.

The network management system apparatus 420 stores a group number table 430 shown in FIG. 3 which shows a group number for a peculiar number and a radio channel data table shown in FIG. 4 which includes a plurality of groups of radio channel data for every group number. The radio channel data table stores m (m is equal to the number of the base station control apparatuses) groups of radio channel data. In this example, each group is composed of n radio channel data. A flag is provided for each of the n radio channel data, is set when a radio channel corresponding to the flag is used and reset when the radio channel is not used. The network management system apparatus 420 refers to the group number table 430 based on the peculiar number of each of the plurality of base station control apparatuses to determine the group number. Then, the network management system apparatus 420 refers to the radio channel data table 440 based on the group number to determine one of the plurality of groups of radio channel data. Last, the network management system apparatus 420 transmits the radio channel data table including the determined group of radio channel data to the base station control apparatus.

FIG. 2 is a block diagram showing the structure of the base station control apparatus 100 (100-1, 100-2) in a CDMA cellular system according to the first embodiment of the present invention. Referring to FIG. 2, the base station control apparatus 100 in the first embodiment is composed of a channel selecting section 2, a radio base station interface section 3 and a storage section 4.

The storage section 4 stores the radio channel data table which has been transmitted from the network management system apparatus 420. Referring to FIG. 4, the radio channel data table stores the radio channel data for the group 1, for example.

The channel selecting section 2 refers to the radio channel data table stored in the storage section 4 in response to a channel allocation request from the radio terminal 300-1 via the radio base station 200-2 to search the reset flags, and selects one of the radio channel data corresponding to the reset flags.

The radio base station interface section 3 informs the selected radio channel data to the radio base station 200-2. The radio base station 200-2 establishes a radio channel between the station 200-2 and the radio terminal.

Next, an operation of the CDMA cellular system in the first embodiment will be described.

Now, it is supposed that the general subscriber telephone 600 and the radio terminal 300-1 communicate with each other. In this case, it is necessary to establish a communication channel from the radio terminal 300-1 to the cellular system switching apparatus 400 via the base station control apparatus 100-1 and the radio base station 200-2. In the CDMA cellular system, in order to establish the communication channel, a not-used radio channel is allocated between the terminal 300-1 and the radio base station 200-2.

For preparation of the radio channel data table, the network management system apparatus 420 refers to the group number table 430 based on the peculiar number to the base station control apparatus 100-1 to acquire the peculiar number G. Then, the network management system apparatus 420 refers to the radio channel data table 440 stored therein based on the selected group number G to determine the group of radio channel data. Subsequently, the network management system apparatus 420 transmits the radio channel data table including the determined group of radio channel data to the base station control apparatus 100-1, and the base station control apparatus 100-1 stores the radio channel data table in the storage section 4.

In this way, the network management system apparatus 420 can select for the radio base station 100-1, the radio channel data group which is different from the radio channel data group selected for the base station control apparatus 100-2. Specifically, the group number table 430 of the network management system apparatus 420 is determined as follows. That is, the network management system apparatus 420 determines the group number G for the base station control apparatus 100-1 based on the base station control apparatus peculiar number R in accordance with the following equation (1).

$$\text{The group number } G = (R) \bmod m \tag{1}$$

Where m is the number of groups which may be equal to the number of the base station control apparatuses. In this case, the relation of peculiar number R to the base station control apparatus and the group number G is previously determined and stored in the group number table 430, as shown in FIG. 3.

In the generation of a call from the radio terminal 300-1, the radio terminal 300-1 issues a radio channel allocation request to the radio base station 200-2 through a common control channel (not shown), and the radio base station 200-2 passes the radio channel allocation to the base station control apparatus 100-1. In response to the radio channel allocation request, the base station control apparatus 100-1 refers to the radio channel data table stored in the storage section 1 to select radio channel data corresponding to the unused radio channel for establishing a radio channel between the radio base station 200-2 and the terminal 300-1. In the base station control apparatus 100-1, an unused radio channel data which is not allocated to the other radio terminals is selected from the radio channel data group. Then, the selected radio channel data is allocated to the radio terminal 300-1 and the radio base station 200-2, and then the flag corresponding to the selected radio channel data is set in the channel group table 4 by the channel selecting section 2 to indicate that the radio channel data is allocated. The flag is reset by the channel selecting section 2 when the communication using the radio channel is ended.

Next, the radio base station interface section 3 of the base station control apparatus 100-1 notifies the radio channel data selected by the channel selecting section 2 to the radio base station 200-2. Then, the radio base station 200-2 notifies the allocated radio channel corresponding to the selected radio channel data to the terminal 300-1 through the common channel (not shown). After that, the radio channel is established using the radio channel data allocated newly between the radio terminal 300-1 and the radio base station 200-2.

At the same time, a communication channel is established in a wire from the radio base station 200-2 to the general subscriber telephone 600 via the base station control apparatus 100-1, the cellular system switching apparatus 400 and the general network 500.

In this case, the radio channel data allocated between the terminal 300-1 and the radio base station 200-2 is one of the radio channel data group which is peculiar to the base station control apparatus 100-1, and is not allocated for the other terminals. Therefore, the established radio channel is not same as the channels used in the radio base stations 200-1 to 200-3 belonging to the base station control apparatus 100-1, and it is never same as the channels used in the radio base stations 200-4 to 200-6 belonging to the base station control apparatus 100-2.

The channel allocation is carried out between the radio terminal 300-1 and the radio base station 200-2 in response to the generation of a call from the radio terminal 300-1, similarly even in case that the radio terminal 300-1 communicates with the radio terminal 300-2 belonging to the base station control apparatus 100-2.

Also, a communication channel is established in a wire from the cellular system switching apparatus 400 to the radio base station 200-5 through the base station control apparatus 100-2. Also, the base station control apparatus allocates a channel between the radio base station 200-5 and the radio terminal 300-2. Thus, a radio channel is established between the radio base station 200-5 and the radio terminal 300-2 using the allocated radio channel.

In this case, the radio channel data group used in the base station control apparatus 100-1 and the radio channel data group used in the base station control apparatus 100-2 are different. Therefore, there is no case that the radio channel allocated between the terminal 300-1 and the radio base station 200-2 and the radio channel allocated between the terminal 300-2 and the radio base station 200-5 are same.

In this way, in the CDMA cellular system in the first embodiment, the channels usable in the system are divided into a plurality of groups. The network management system apparatus 420 determines a specific one from among the plurality of groups based on the group number corresponding to the peculiar number to the base station control apparatus. The base station control apparatus 100 selects one of the radio channel data group and carries out the channel allocation. Therefore, it is possible to prevent that the channels allocated to the radio base stations contained in the different base station control apparatuses are same.

Above, the embodiment of the present invention has been described in detail using the drawing. However, a specific structure is not limited to this embodiment, and a modification is contained in the present invention even if the design change is made in a range where the modification does not deviate from the spirit of the present invention. For example, in the radio channel data table shown in FIG. 4, the number of channels which belongs to each group is same. However, in case of the first embodiment, the number of channels in each group does not have to be always same. Also, the time data generated by the time data generating section 5 is not limited to for every hour but may be different from this.

As described above, according to the CDMA cellular system of the present invention, in each base station control apparatus, a channel group is selected from the base station control apparatus peculiar number, or the time data and the base station control apparatus peculiar number, and the channel of the radio section is determined from among the group. Therefore, even if the base station control apparatus and the other base station control apparatus do not communicate with each other, the channel allocated to the base station control apparatus is never same as the channel allocated to the other base station control apparatus.

Therefore, even if a terminal carries out hand-over from the base station control apparatus and the other base station control apparatus, the channels of the radio sections never become same. Therefore, the occurrence of the interference and the call disconnection can be surely prevented.

What is claimed is:

1. A CDMA cellular system comprising:
a plurality of base station control apparatuses, each of which is provided for a service area of cells; and
a plurality of radio base stations, each of which is provided for one of the cells and is connected with one of said plurality of base station control apparatuses,
wherein each of said plurality of base station control apparatuses has a radio channel data table including a group of radio channel data as a specific group of radio channel data, and selects one of said radio channel data of said specific group as a specific radio channel data in response to a channel allocation request,
said specific groups of radio channel data for said plurality of base station control apparatuses are different from each other, and
said one radio base station establishes a radio channel between said one radio base station and a radio terminal associated with said channel allocation request based on said specific radio channel data,
wherein each of said plurality of base station control apparatuses comprises:
a storage section which stores said radio channel data table including said specific group of radio channel data;
a channel selecting section which refers to said radio channel data table in response to said channel allocation request to determine one of said radio channel data of said specific group as said specific radio channel data; and
an informing section which informs said specific radio channel data to said one radio base station, and
wherein said one radio base station establishes said radio channel between said one radio base station and said radio terminal based on said specific radio channel data.

2. The CDMA cellular system according to claim 1, further comprising:
a network management system apparatus which transmits said plurality of said radio channel data tables to said plurality of base station control apparatuses, respectively,
wherein said specific groups of radio channel data for said plurality of base station control apparatuses are different from each other.

3. The CDMA cellular system according to claim 2, wherein each of said plurality of base station control apparatuses has a peculiar number, and said network management system apparatus determines a group number based on said peculiar number and determines said specific group of said radio channel data based on said group number.

4. The CDMA cellular system according to claim 3, wherein said network management system apparatus determines said group number G based on the following equation (1):

$$G = R \bmod m \qquad (1)$$

where R is said peculiar number, and m is the number of said base station control apparatuses.

5. The CDMA cellular system according to claim 1, wherein each of said radio channel data of said specific group has a flag to indicate that a radio channel corresponding to said radio channel data is being used, and
said channel selecting section selects said specific radio channel data from among said radio channel data of said specific group based on said flags.

6. The CDMA cellular system according to claim 5, wherein said channel selecting section sets said flag corresponding to said specific radio channel data being in a reset state, and resets said flag corresponding to said selected radio channel data, when communication on said radio channel established based on said specific radio channel data is disconnected.

7. The CDMA cellular system according to claim 1, wherein the number of said radio channel data of said specific group for one of said plurality of base station control apparatuses is different from the number of said radio channel data of said specific group for another of said plurality of base station control apparatuses.

8. A CDMA cellular system comprising:
a plurality of base station control apparatuses, each of which is provided for a service area of cells; and a plurality of radio base stations, each of which is provided for one of the cells and is connected with one of said plurality of base station control apparatuses, wherein each of said plurality of base station control apparatuses has a radio channel data table including a plurality of groups of radio channel data, and selects one of said plurality of groups of radio channel data as said specific group of radio channel data, and selects one of said radio channel data of said specific group as a specific radio channel data in response to a channel allocation request, said specific radio channel data being unique to one of said plurality of base station control apparatuses, said one radio base station establishes a radio channel between said one radio base station and a radio terminal associated with said channel allocation request based on said specific radio channel data.

9. The CDMA cellular system according to claim 8, wherein each of said plurality of base station control apparatuses selects one of said plurality of groups of radio channel data as said specific group of radio channel data based on time data.

10. The CDMA cellular system according to claim 9, wherein each of said plurality of base station control apparatuses comprises:

a timer section which generates said time data;

a storage section which stores said radio channel data table including a plurality of groups of radio channel data;

a channel selecting section which selects one of said plurality of groups of radio channel data as said specific group of radio channel data based on said time data in response to said channel allocation request, and determine one of said radio channel data of said specific group as said specific radio channel data; and an informing section which informs said specific radio channel data to said one radio base station, and wherein said one radio base station establishes said radio channel between said one radio base station and said radio terminal based on said specific radio channel data.

11. The CDMA cellular system according to claim 10, wherein each of said plurality of base station control apparatuses has a peculiar number, and said channel selecting section determines a group number based on said peculiar number and said time data and selects said specific group of said radio channel data based on said group number.

12. The CDMA cellular system according to claim 11, wherein said channel selecting section determines said group number G based on the following equation (2):

$$G=(R+T) \bmod m \quad (2)$$

where R is said peculiar number, T is said time data and m is the number of said base station control apparatuses.

13. The CDMA cellular system according to claim 10, wherein each of said radio channel data of said specific group has a flag to indicate that a radio channel corresponding to said radio channel data is being used, and said channel selecting section selects said specific radio channel data from among said radio channel data of said specific group based on said flags.

14. The CDMA cellular system according to claim 13, wherein said channel selecting section sets said flag corresponding to said specific radio channel data being in a reset state, and resets said flag corresponding to said selected radio channel data, when communication on said radio channel established based on said specific radio channel data is disconnected.

15. The CDMA cellular system according to claim 8, wherein the number of said radio channel data of said specific group for one of said plurality of base station control apparatuses is different from the number of said radio channel data of said specific group for another of said plurality of base station control apparatuses.

16. The CDMA cellular system according to claim 8, wherein the number of said radio channel data is different for every group.

17. A method of establishing a unique radio channel in a CDMA cellular system which comprises a plurality of base station control apparatuses, each of which is provided for a service area of cells; and a plurality of radio base stations, each of which is provided for one of the cells and is connected with one of said plurality of base station control apparatuses, wherein a specific one of said plurality of radio base stations accommodates a radio terminal, and a specific one of said plurality of base station control apparatuses accommodates said specific radio base station, said method comprising the steps of:

(a) said specific base station control apparatus storing a radio channel data table including a group of radio channel data as a specific group of radio channel data, wherein said specific groups of radio channel data for said plurality of base station control apparatuses are different from each other;

(b) said specific base station control apparatus selecting one of said radio channel data of said specific group as a specific radio channel data in response to a channel allocation request; and (c) said specific radio base station establishing a radio channel with a radio terminal associated with said channel allocation request based on said specific radio channel data.

18. The method according to claim 17, wherein each of said plurality of base station control apparatuses has a peculiar number, and a network management system apparatus is connected with said plurality of base station control apparatuses, said method further comprises the step of:

(d) said network management system apparatus determining a group number for said specific base station control apparatus based on said peculiar number;

(e) said network management system apparatus determining one of a plurality of groups of said radio channel data of said radio channel data table based on said group number; and (f) said network management system apparatus transmitting said radio channel data table including the determined group of radio channel data as said specific group of radio channel data to said specific base station control apparatus.

19. The method according to claim 17, wherein each of said plurality of base station control apparatuses has a peculiar number, and said radio channel data table includes a plurality of groups of radio channel data, said (b) selecting step comprises the steps of:
(g) said specific base station control apparatus generating time data;
(h) said specific base station control apparatus determining a group number based on said peculiar number and said time data;
(i) said specific base station control apparatus determining one of said plurality of groups of radio channel data as said specific group of radio channel data based on said group number; and
(j) said specific base station control apparatus selecting one of said radio channel data of said specific group as said specific radio channel data.

* * * * *